May 31, 1932. C. WINTER 1,860,971
WINDSHIELD WIPER
Filed April 3, 1930
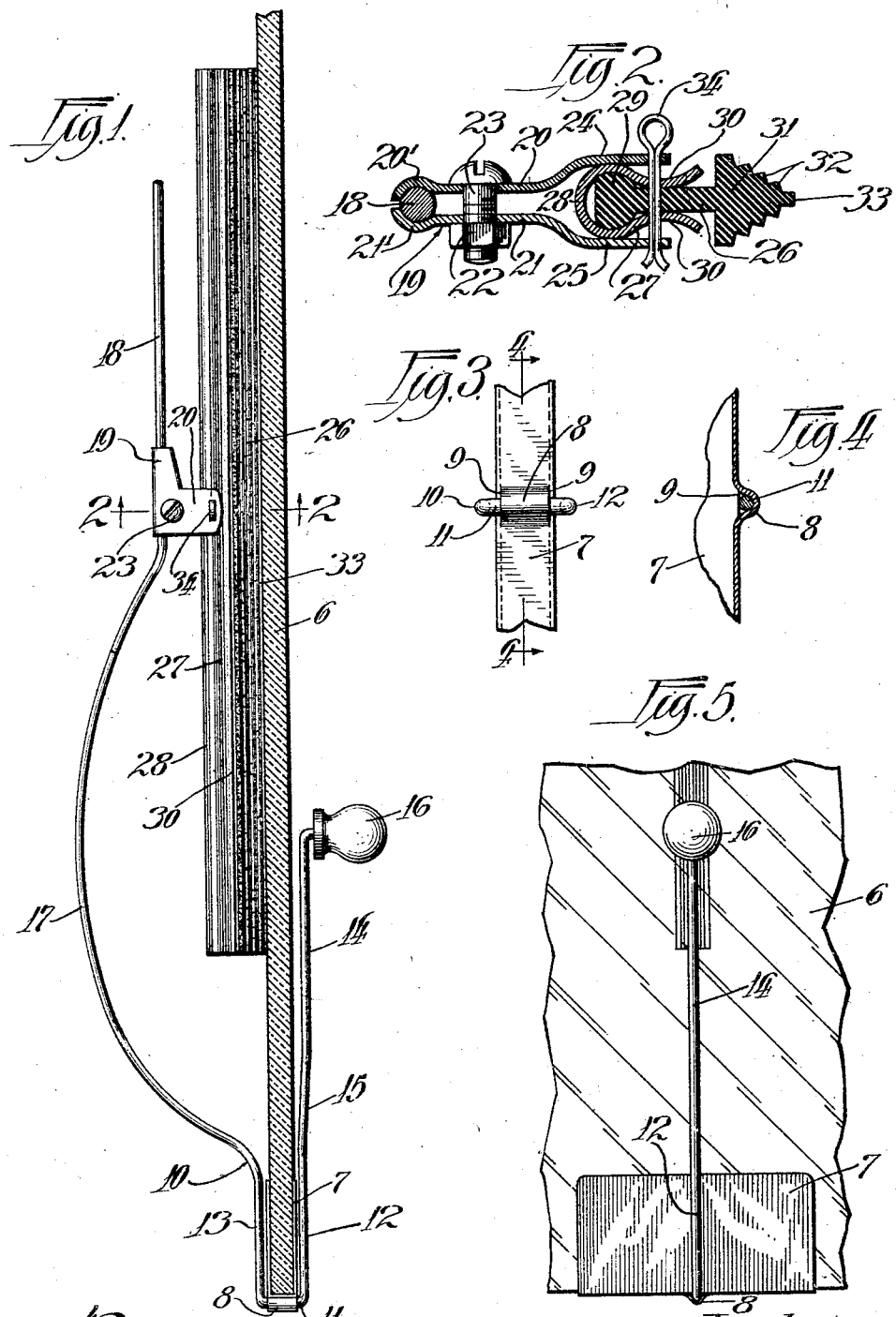

Patented May 31, 1932

1,860,971

UNITED STATES PATENT OFFICE

CHARLES WINTER, OF CHICAGO, ILLINOIS

WINDSHIELD WIPER

Application filed April 3, 1930. Serial No. 441,276.

This invention relates to windshield wipers, and has for its object to produce a simple and inexpensive device of this character which is adjustable and may be readily applied to either the windshield or one of the side windows of an automobile body and detached therefrom, at will; and to attain certain particular advantages as will hereinafter more fully appear.

The invention consists in the novel structure, and in the parts and combinations and arrangements of parts as hereinafter described and set forth with particularity in the appended claims.

In the accompanying drawings, illustrating a practical adaptation of the invention,—

Fig. 1 is a fragmentary section through a windshield panel and showing the windshield wiper in side elevation as applied to said panel;

Fig. 2 is a transverse section through the windshield wiper, on an enlarged scale, the section being taken on or about the line 2—2 of Fig. 1;

Fig. 3 is an edge view of the supporting clip, illustrating details of the hinge for the swinging frame of the device;

Fig. 4 is a fragmentary section on the line 4—4 of Fig. 3; and

Fig. 5 is a fragmentary view, in elevation, showing a portion of the windshield panel and the cooperating supporting clip and handle portion of the wiping device.

Referring now to the drawings, the numeral 6 designates the glass panel of a windshield of an automobile which, in some cases, is pivotally mounted but in the more modern automobile body structures is slidably mounted and is opened by being raised upwardly. In this connection also, as far as the present invention is concerned, it may be here noted that the wiping device may be interchangeably applied to the glass panels of the side windows of the automobile body, the only difference being that in the case of the windshield the device is applied to the lower edge portion of the panel 6, while in the case of the side window it is applied to the upper edge portion thereof as the latter is lowered to open the window in practically all body structures.

As shown, the wiping device comprises a supporting clip 7 which is generally rectangular and substantially U-shaped in cross-section, and preferably formed of sheet metal. At the middle of the base portion of the clip 7 a loop 8 is provided, preferably by slitting said portion longitudinally near the side walls thereof, as at 9, and best shown in Fig. 3 of the drawings, and then pressing the metal outwardly to constitute the loop. Hingedly supported in the loop 8 is a swinging frame 10, which preferably comprises a relatively stiff wire which is bent to form a substantially U-shaped intermediate portion whose transverse base portion 11 extends through the loop 8 and whose leg portions 12 and 13 are parallel and extend across the side walls of the clip 7 in closely adjacent but spaced relation thereto. The leg 12 is extended to form a handle 14, which extension, as shown, is slightly offset, as at 15, so as to afford ample clearance between the handle and the adjacent face of the windshield panel 6, and the handle being preferably provided with a knob 16 for convenience in manipulating the device.

The leg 13 of the swinging frame 10 is offset to a considerable extent, as at 17, said offset portion being bowed outwardly beyond a straight end portion 18 which extends substantially parallel with the outer face of the windshield panel 6. Adjustable on the straight end portion 18 of the swinging frame 10 is a supporting bracket 19 in the form of a clip comprising a cooperating pair of opposed members 20 and 21 whose end portions 20' and 21' are respectively formed so as to partially encompass the adjacent portion of the extension 18 of the swinging frame 10 with clamping effect when the nut 22 is tightened on the screw 23 which secures the two members 20 and 21 together. The opposite end portions of the members 20 and 21 are offset laterally, as at 24 and 25, respectively, between which portions a squeegee 26 is pivotally mounted.

The squeegee 26, as shown, preferably comprises a channeled base member 27, which is preferably formed of sheet metal, the base portion of said member 27 being preferably rounded, as at 28, thereby producing a bead which materially stiffens it and at the same time provides an internally chambered portion for the accommodation of the beaded enlargement 29 of the squeegee 26, the reduced middle portion of the latter being overlapped by the concavo-convex side portions 30 of said member 27, and the outer portion of said squeegee being enlarged, as at 31, producing a bead which is substantially triangular in cross-section and the sides of said portion 31 being corrugated, as at 32, to produce longitudinal ribs which are preferably V-shaped, as shown, and a rib 33, which is preferably rectangular in cross-section, being formed at the ridge of said enlargement 31. The squeegee is hingedly supported on the portions 24 and 25 of the bracket 19 by a cotter pin 34 which is inserted through alined openings in the portions 24 and 25 of said bracket 19 and the adjacent portions of the squeegee members 26 and 30.

In applying the device to the windshield of an automobile body, it is only necessary to raise the panel 6 of the windshield sufficiently to pass the clip 7 thereunder, at which time the frame 10 may be swung to a horizontal position so as to pass under the panel 6 with the clip 7, and after the clip 7 is placed over the adjacent marginal portion of the panel 6, the panel is lowered until the base portion of the clip is brought into engagement with the frame surrounding the windshield opening, after which the windshield wiper is manipulated by grasping the knob 16 on the handle extension 14. In case it is desirable to apply the wiping device to one of the side windows of the automobile, the glass panel thereof is lowered and the clip 7 placed over the upper edge of said panel and then the window is raised to closed position so that the clip is held firmly between the edge of the glass panel and the adjacent portion of the window frame. In this application of the wiping device it is manipulated just the same as when applied to the windshield, except that in the one case it is applied at the lower portion of the panel and in the other case at the upper portion thereof. By providing for the adjustment of the supporting bracket 19 on the extension 18 of the rocking frame 10 the squeegee 26 may be obviously adjusted to operate in the area most convenient for the vision of the driver or passenger in the car.

From the foregoing it is apparent that a wiping device is produced which may be readily applied to the windshield to take the place of the ordinary wiping device which is usually applied as a part of the regular standard equipment, or supplemental thereto as an auxiliary device, and, further, owing to the nominal cost at which the device may be produced, extra wipers may be carried for emergencies where it would be advantageous to apply them to the side windows of the car as well as the windshield, for the convenience of passengers as well as the driver.

Obviously, the device may be modified considerably in its structural details and arrangements without departing from the spirit and scope of the invention as defined by the appended claims. The invention, therefore, is not limited to the specific construction and arrangement shown in the accompanying drawings.

Having thus described my invention, what I claim as new and desire to secure by Letters Patent is:

1. In a windshield wiper or the like, a substantially U-shaped clip having a loop formed in its base portion and being adapted to straddle the edge portion of a panel to be wiped and engage the sides of said panel, a rockable frame having a substantially U-shaped intermediate portion of slightly greater width than said U-shaped clip, the base portion of said substantially U-shaped intermediate portion being inserted in said loop, one side of said rockable frame being bent outwardly and inwardly into a substantially elliptical shape and its extreme end being disposed substantially parallel to the uprights of said U-shaped portion and the opposite side of said rockable frame being offset from the other upright of said U-shaped portion and a squeegee mounted on the first of said sides.

2. In a windshield wiper or the like, a substantially U-shaped member having a loop formed in its base portion and being adapted to straddle the edge portion of a panel to be wiped and engage the sides of said panel, a rockable frame having a substantially U-shaped intermediate portion of slightly greater width than said U-shaped member, the base portion of said substantially U-shaped intermediate portion being inserted in said loop, one side of said rockable frame being bent outwardly and inwardly into a substantially elliptical shape and its extreme end being disposed substantially parallel to the uprights of said U-shaped portion and the opposite side of said rockable frame being offset from the other upright of said U-shaped portion and a squeegee mounted on the first of said sides.

In testimony whereof I have signed my name to this specification.

CHARLES WINTER.